United States Patent [19]

Strong et al.

[11] Patent Number: 5,561,203

[45] Date of Patent: *Oct. 1, 1996

[54] SILICONE PRESSURE SENSITIVE ADHESIVE COMPOSITION

[75] Inventors: Michael R. Strong; Bernard VanWert; Martin E. Cifuentes, all of Midland, Mich.

[73] Assignee: Dow Corning Corporation, Midland, Mich.

[ * ] Notice: The term of this patent shall not extend beyond the expiration date of Pat. No. 5,302,671.

[21] Appl. No.: 479,202

[22] Filed: Apr. 13, 1995

Related U.S. Application Data

[63] Continuation of Ser. No. 262,792, Jun. 20, 1994, abandoned.

[51] Int. Cl.$^6$ ............................................. C08F 283/00
[52] U.S. Cl. ............................................. 525/477; 528/17
[58] Field of Search ................................ 525/477; 528/17

[56] References Cited

U.S. PATENT DOCUMENTS

| | | | |
|---|---|---|---|
| 2,676,182 | 4/1954 | Daudt et al. | 260/448.2 |
| 4,584,355 | 4/1986 | Blizzard et al. | 525/477 |
| 4,585,836 | 4/1986 | Homan et al. | 525/477 |
| 4,591,622 | 5/1986 | Blizzard et al. | 525/477 |
| 5,252,685 | 10/1993 | Arai et al. | 525/477 |
| 5,302,671 | 4/1994 | Cifuentes et al. | 525/477 |
| 5,340,887 | 8/1994 | Vincent et al. | 525/477 |

FOREIGN PATENT DOCUMENTS

| | | | |
|---|---|---|---|
| 481487 | 8/1992 | Japan | C09J 183/04 |

*Primary Examiner*—Melvyn I. Marquis
*Attorney, Agent, or Firm*—Sharon K. Severance

[57] ABSTRACT

Silicone pressure sensitive compositions that combine high ultimate strength in a cured network with a lower modulus and have improved adhesive strength at elevated temperatures are disclosed. The pressure sensitive adhesive compositions are comprised of (A) a soluble, capped, organopolysiloxane resin containing less than 1.2 weight percent silicon-bonded hydroxyl groups based on the total weight of (A); (B) a diorganopolysiloxane polymer, each terminal group thereof containing at least two silicon-bonded hydrolyzable radicals said polymer having a viscosity at 25° C. of 20 to 100,000 mm$^2$/s; and (C) a hydrolyzable silane.

36 Claims, No Drawings

1

SILICONE PRESSURE SENSITIVE ADHESIVE COMPOSITION

This is a continuation of application Ser. No. 08/262,792 filed on Jun. 20, 1994; now abandoned.

BACKGROUND OF THE INVENTION

Adhesive compositions are typically comprised of a silicone resin such as an MQ resin and a polydiorganosiloxane fluid containing sufficient hydrolyzable/condensable functionality to crosslink and form a cured matrix. MQ resins which contain a significant level of Si-bonded hydroxyls, or whose surface has been rendered inert through an additional trimethylsilylation capping reaction, are useful for these types of adhesive sealants.

Adhesive systems, containing MQ resin having a significant amount of reactive —SiOH produce strong adhesive products which demonstrate the ability to provide an acceptable level of adhesive strength, not only at room temperature, but also at elevated temperatures (e.g. >120° C.). This is important in some applications where the laminated part has to operate at temperatures of at least 120° C. In addition to providing sites for interaction with the fluid portion of the adhesive matrix, the hydroxyl content can also be a source of instability and abbreviated shelf life in the final product. Shelf life of these systems can be improved via the addition of reactive, hydrolyzable silanes. The degree of improvement in stability is dependent upon both the type and concentration of silane added to the mixture.

Capped resins can also be used to produce high-strength, moisture curable adhesives. For example, Japanese Kokai Patent Application No. Hei 4[1992]81487 to Arai et al. discloses a pressure sensitive composition containing (1) an organosiloxane polymer resin having less than 0.7 wt % hydroxylsilyl radicals (2) a hydrolyzable group containing organopolysiloxane having a viscosity of 50 to 300,000 mm$^2$/s and (3) a condensing catalyst.

Although the compositions produced using capped resins are stable in the absence reactive silanes, they do not retain a sufficient amount of adhesive strength for service at elevated temperatures.

It is an object of the instant invention to provide pressure sensitive adhesive compositions which can be cured in the presence of moisture and that has high adhesive strength at elevated temperatures.

SUMMARY OF THE INVENTION

The instant invention pertains to silicone pressure sensitive adhesive compositions comprising (A) 5 to 90 parts of a soluble, capped, organopolysiloxane resin consisting essentially of $R_3SiO_{1/2}$ siloxane units and $SiO_{4/2}$ siloxane units, wherein R is a monovalent hydrocarbon radical having 1 to 18 carbon atoms; there being from 0.5 to 1.5 $R_3SiO_{1/2}$ units for every $SiO_{4/2}$ units and containing less than 1.2 weight percent silicon-bonded hydroxyl groups based on the total weigth of (A) solids as determined by $Si^{29}$ NMR;

(B) 10 to 95 parts of a diorganopolysiloxane polymer, each terminal group thereof containing at least one silicon-bonded hydrolyzable functional radicals selected from the group consisting of hydroxyl radicals, alkoxy radicals having 1 to 4 carbon atoms, ketoxime radicals, aminoxy radicals, acetamido radicals, N-methylacetamido radicals and acetoxy radicals; said polymer having a viscosity at 25° C. of 20 to 100,000 mm$^2$/s; wherein the amount of (A) and (B) comprises 100 parts;

(C) 1 to 30 parts per 100 parts of resin (A) solids of silane monomers of the formula $R^3_{4-y}SiX_y$ or oligomeric reaction products thereof, in which $R^3$ is selected from the group consisting of hydrocarbon radicals and substituted hydrocarbon radical having 1–6 carbon atoms, X is a hydrolyzable group and y is 2 to 4;

optionally (D) sufficient cure catalyst to accelerate the cure of said composition; and optionally (E) up to 50 weight percent of a filler.

The compositions of the instant invention combine high ultimate strength in a cured network with a lower modulus and have improved adhesive strength at elevated temperatures.

THE INVENTION

Component (A) of the present invention is a soluble, capped organopolysiloxane resin that consists essentially of $R_3SiO_{1/2}$ siloxane units and $SiO_{4/2}$ siloxane units. By the term soluble it is meant that the resin can be dissolved, substantially completely, in either a hydrocarbon liquid such as benzene, toluene, xylene, heptane and the like or in a silicone liquid such as a low viscosity cyclic or linear polydiorganosiloxanes. The organopolysiloxane resins (A) of the instant invention contain no more than 1.2 weight percent silicon-bonded hydroxyl groups based on the total weigth of (A) solids as determined by $Si^{29}$NMR, and preferably contain no more than 1.0 weight percent.

In the $R_3SiO_{1/2}$ siloxane units each R individually is a monovalent hydrocarbon radical having less that 18 carbon atoms, preferably having from 1 to 10 carbon atoms. Examples of suitable hydrocarbon R radicals include alkyl radicals, such as methyl, ethyl, propyl, pentyl, octyl, undecyl and octadecyl; alkenyl radicals, such as vinyl, allyl and 5-hexenyl; cycloaliphatic radicals, such as cyclohexyl and cyclohexenylethyl; and aryl radicals such as phenyl, tolyl, xylyl, benzyl and 2phenylethyl. At least one-third, and more preferably substantially all R radicals are methyl radicals. Examples of preferred $R_3SiO_{1/2}$ siloxane units include $Me_3SiO_{1/2}$, $ViMe_2SiO_{1/2}$, $PhMe_2SiO_{fra\ 1/2}$, and $Ph_2MeSiO_{1/2}$ where Me denotes methyl and Ph denotes phenyl.

The mole ratio of the $R_3SiO_{1/2}$ siloxane units to $SiO_{4/2}$ siloxane units of organopolysiloxane resin (A) has a value of from 0.5/1 to 1.5/1, preferably from 0.6/1 to 1.0/1. These mole ratios are easily measured by $Si^{29}$ nuclear magnetic resonance (NMR).

Methods for producing capped organopolysiloxane resins are well known in the art. The capped organopolysiloxane resin (A) may be prepared by first preparing an untreated resin copolymer according to Daudt, et al., U.S. Pat. No. 2,676,182, and, thereafter, treating an organic solvent solution of the untreated resin copolymer with a suitable endblocking agent to reduce the amount of silicon-bonded hydroxyl units to reduce the amount of silicon-bonded hydroxyl units to less than about 1.2 weight percent, and preferably less than 1.0 wt %, and more preferably less than 0.8 wt %; as determined by $Si^{29}$ NMR.

Endblocking agents capable of providing endblocking triorganosilyl units are commonly employed as silylating agents. A wide variety of agents are known and disclosed in U.S. Pat. No. 4,584,355 and U.S. Pat. No. 4,591,622 to Blizzard, et al., and U.S. Pat. No. 4,585,836 to Homan, et al.

which are hereby incorporated by reference. A single endblocking agent such as hexamethyldisilazane can be used or a mixture of such agents can be used. The procedure for treating the resin copolymer may be simply to mix the endblocking agent with a solvent solution of the resin copolymer and allowing the by-products to be removed. Preferably, an acid catalyst is added and the mixture is heated to reflux conditions for a few hours.

Component (B) of thepresent invention is a diorganopolysiloxane polymer, each terminal group thereof containing at least one, preferably two, silicon-bonded hydrolyzable functional radical selected from the group consisting of hydroxyl radicals, alkoxy radicals having 1 to 4 carbon atoms, ketoxime radicals, acetamido radicals, N-methylacetamido radicals and acetoxy radicals. The repeat units of diorganopolysiloxane (B) are $R_2SiO_{2/2}$ siloxy units wherein R is independently selected from the same hydrocarbon and halogenated hydrocarbon radicals delineated above for component (A).

Component (B) can comprise a single diorganopolysiloxane or a mixture of two or more different diorganopolysiloxanes. Component (B) should have a viscosity at 25° C. of about 20 to 100,000 $mm^2/s$, preferably 350 to 60,000 $mm^2/s$. It is preferred that at least 50%, and preferably at least 85%, of the organic radicals along the chain of component (B) are methyl radicals, which radicals can be distributed in any manner in the diorganopolysiloxane. Further, component (B) can contain siloxane branching sites provided it meets the above viscosity requirements. The side chains emanating from such branch points, of course, have terminal units which can also contain the above described hydrolyzable radicals.

The terminal units of diorganopolysiloxane (B) are selected from the group consisting of R, hydroxyl radicals, alkoxy radicals having 1 to 4 carbon atoms, ketoxime radicals, acetamido, N-methylacetamido and acetoxy radicals. It is preferred that hte terminal units contain at least one terminal group selected from the group consisting of alkoxy radicals having 1 to 4 carbon atoms, ketoxime radicals, aminoxy radicals, acetamido, N-methylacetamido and acetoxy radicals. When the hydrolyzable group is a hydroxyl radical or an alkoxy radical it is preferred that the diorganopolysiloxane contain at least two terminal hydrolyzable functional radicals.

The alkoxy radicals may be exemplified by the formula $-ZSiR^1_x(OR^2)_{3-x}$ wherein $R^1$ is a monovalent hydrocarbon radical. $R^2$ is selected from the group consisting of a alkyl radical and alkoxyalkyl radical, Z is a divalent linking radical, and the subscript x has a value of 0 or 1.

In the preceding formula for the alkoxy terminal units $R^1$ is a monovalent hydrocarbon radical having from 1 to 10, preferably 1 to 6 carbon atoms. $R^1$ may be exemplified by, but not limited to, alkyl radicals such as methyl, ethyl, propyl, and isopropyl; alkenyl radicals such as vinyl; and aryl radicals such as phenyl.

$R^2$ is a alkyl or alkoxyalkyl radical, preferably having less than 5 carbon atoms. $R^2$ may be exemplified by, but not limited to methyl, ethyl, isopropyl, methoxyethyl, or ethoxyethyl. R' is preferably methyl.

The Z radical is a divalent linking radical linking the silicon atom of the curing radical to a silicon atom of the resin. Z is typically selected from the types of divalent radicals that are used to link silicon atoms in a hydrolytically stable manner and include, but are not limited to, oxygen; hydrocarbons such as alkylene, for example ethylene, propylene, and isobutylene and phenylene; hydrocarbon containing one or more hetero atoms selected from oxygen, nitrogen and sulfur, for example, ether-, thioether-, ester- or amide-containing hydrocarbon; siloxanes, for example polydimethylsiloxane; and combinations thereof.

Preferably, Z is selected from the group of radicals having the formula $-D(Me_2SiO)_a(Me_2SiC_2H_4)_b-$ wherein Me denotes methyl, D denotes oxygen (—O—) or $-CH_2CH_2-$, subscript a has a value of 0 to 2, preferably 1, and subscript b has a value of 0 to 6, preferably 0 or 1, the sum of $a+b \geq 0$. Z may be exemplified by, but not limited to, $-CH_2CH_2(OSiMe_2)-$, $-O(Me_2SiCH_2CH_2)-$, $-CH_2CH_2(OSiMe_2)(Me_2SiCH_2CH_2)-$, $-O(OSiMe_2)(Me_2SiCH_2CH_2)-$, $-CH_2CH_2(Me_2SiCH_2CH_2)-$, $-CH_2CH_2-$, $-O(Me_2SiO)-$ and $-O-$. Most preferably Z contains an ethylene linkage bonded to the silicon containing the $-OR^2$ radicals.

Specific examples of suitable curing radicals include, but are not limited to, $(MeO)_3SiCH_2CH_2-$, $(MeO)_3SiO-$, $Me(MeO)_2SiO-$, $(MeO)_3SiCH_2CH_2Si(Me_2)CH_2CH_2Si(Me_2)O-$, $(MeO)_3SiCH_2CH_2Si(Me_2)O-$, $(MeO)_3SiCH_2CH_2Si(Me_2)OSi(Me_2)OSi(Me_2)O-$ and $(MeO)_3SiCH_2CH_2Si(Me_2)OSi(Me_2)CH_2CH_2-$. A highly preferred diorganopolysiloxane (B) of the invention is a polydimethylsiloxane which is terminated with groups having the structures $(MeO)_3SiCH_2CH_2Si(Me)_2O-$, $(MeO)_3SiO-$, $(MeO)_3SiCH_2CH_2Si(Me_2)OSi(Me_2)CH_2CH_2-$, or $Me(MeO)_2SiO-$.

The preparation of diorganopolysiloxane polymers having such alkoxy terminal groups is described in detail in U.S. Patent application Ser. No. 08/063,105 filed May 14, 1993, U.S. Pat. No. 5,470,923, hereby incorporated by reference to teach these perparative methods. Alkoxy functional groups having the representative formulae $(MeO_3SiO-$ and $Me(MeO)_2SiO-$ can be introduced into a silanol-terminated diorganopolysiloxane by compounds having the formulae $(MeO)_4Si$ and $Me(MeO)_3Si$, respectively, as is well known in the art.

The ketoxime radicals may be exemplified by general formula $-ONC(R^4)_2$, in which each $R^4$ independently represents an alkyl radical having 1 to 6 carbon atoms or a phenyl radical. Methods for producing diorganopolysiloxanes having ketoxime radicals are known in the art. The ketoxime radicals may be further exemplified by, but not limited to, dimethylketoxime, methylethylketoxime, and cyclohexanoxime.

Other hydrolyzable functional radicals may be exemplified by, but not limited to acetamido radicals, N-methylacetamido radicals and acetoxy radicals.

The hydrolyzable functional diorganopolysiloxane (B) may be also prepared from a hydroxyl-functional diorganopolysiloxane by reacting the latter with an hydrolyzable functional silane. This reaction is typically conducted in the presence of a suitable process catalyst such as an alkyl titanate. Heating of the mixture may be required for the raction to proceed at a useful rate. Alternatively, a hydroxyl-functional diorganopolysiloxane can be capped in-situ by reacting it with an hydrolyzable functional silane in the presence of a solution of resin (A) and, preferably, also in the presence of a process catalyst such as stannous octoate, and amine, a base, or tetrabutyltitanate. When the catalyst of the above described in-situ process is an $Sn^{II}$ salt, the catalyst is de-activated thermally, or by an appropriate agent before further processing. Likewise, when the in-situ catalyst is a base, such as potassium carbonate, this base is neutralized before further processing.

The preferred diorganopolysiloxane (B) of the invention is a polydimethylsiloxane which is terminated with groups having the structures $(MeO)_3SiCH_2CH_2Si(Me_2)OSi(Me_2)CH_2CH_2$—, $(MeO)_3SiO$— or $Me(MeO)_2SiO$—.

The amount of diorganopolysiloxane polymer (B) 10 to 95 parts wherein the sum of (A) and (B) is 100 parts. Preferably component (B) is present from 30 to 60 parts, most preferably 35 to 45 parts wherein the sum of (A) plus (B) is 100 parts.

Silane (C) of the present invention is represented by monomers of the formula $R^3_{4-z}SiX_z$ and oligomeric reaction products thereof; wherein $R^3$ is selected from the group consisting of hydrocarbon radicals and substituted hydrocarbon radicals having 1 to 6 carbon atoms; X is a hydrolyzable group, preferably selected from alkoxy radicals having 1 to 4 carbon atoms, ketoxime radicals, aminoxy radicals, acetamido, N-methylacetamido or acetoxy radicals and subscript z has a value of 2 to 4, preferably 3 to 4. The ketoxime groups are of the general form —$ONC(R^4)_2$, wherein each $R^4$ independently represents an alkyl radical having 1 to 6 carbon atoms or a phenyl radical. Specific examples of preferred silanes include methyltrimethoxysilane, methyltriethoxysilane, propyltrimethoxysilane, tetramethoxysilane, tetraethoxysilane, phenyltrimethoxysilane, isobutyltrimethoxysilane, ethyltrimethoxysilane, glycidoxypropyltrimethoxysilane aminoethylaminopropyltrimethoxysilane 3 -methacryloxypropyltrimethoxysilane, tetra(methylethylketoximo)silane, methyl-tris(methylethylketoximo)silane and vinyl-tris(methylethylketoximo)silane, methyltriacetoxysilane, ethyltriacetoxysiane and others. It is preferred that the silane (C) be selected from alkoxy and oximosilanes.

the amount of silane (C) present is from 1 to 30 parts per 100 parts of resin (A) solids, preferably from 2 to 10 parts per 100 parts of resin (A) solids.

In general, small amounts of additional ingredients may be added to the compositions of this invention. For example, adhesion promoters, antioxidants, pigments, stabilizers, fillers, and others, may be added as long as they do not materially alter the requirements stipulated herein.

Optionally present in the instant composition is a cure catalyst (D), which can be used to accelerate the cure of the instant compositions upon exposure to moisture. The cure catalyst (D) may be selected from those compounds known in the art to promote the hydrolysis and subsequent condensation of the hydrolyzable groups on silicon. Suitable curing catalysts include, but are not limmited to, metal salts of carboxylic acids, such as dibutyltin dilaurate and dibutyltin diacetate, stannous octanoate, ferrous octanoate, zinc napthenate, zinc octanoate, lead 2-ethylhexanoate; organotitanium compounds such as tetrabutyl titanate and 2,5-diisopropoxybis(ethylacetate)titanium; and partially chelated derivatives of these salts with chelating agents such as acetoacetic acid esters and beta-diketones.

A sufficient quantity of catalyst (D) may be added to accelerate the cure of the PSA composition. This amount can readily be determined by the skilled artisan through routine experimentation and is typically about 0.01 to 3 percent based on the combined weight of (A) and (B).

The compositions of the instant invention may be prepared by combining the organopolysiloxane resin (A) and silane (C) preferably in the presence of a solvent and thereafter adding to the mixture the diorganopolysiloxane polymer (B). The composition may be applied from the solvent or the solvent may then be stripped off to provide an essentially solvent-free composition. Catalyst (D) is then optionally added to the solvent based or stipped product.

The stripping (devolatilization) of the PSA compositions can be effectively accomplished by heating the mixture under vacuum, for example at 90° C. to 150° C. and <110 millimeters of mercury in a batch operation. The removal of solvent can also be accomplished by any of the known techniques, such as contact with a stream of inert gas, evaporation, distillation, thin film stripping, and the like. Excessively high temperatures should be avoided when all the components are being devolatilized. A temperature of 200° C., and preferably 150° C., should not be exceeded.

In addition to the above mentioned components a filler (E) may be optionally added to the compositions of this invention. The filler may be added in an amount up to 80 wt %, preferably up to 35 wt %. Fillers useful in the instant invention may be exemplified by, but not limited to, inorganic materials such as pyrogenic silica, precipitated silica and diatomaceous silica, ground quartz, aluminum silicates, mixed aluminum and magnesium silicates, zirconium silicate, mica powder, calcium carbonate, glass powder and fibers, titanium oxides of the pyrogenic oxide and rutile type, barium zirconate, barium sulphate, barium metaborate, boron nitride, lithopone, the oxides of iron, zinc, chrome, zirconium, and magnesium, the different forms of alumina (hydrated or anhydrous), graphite, conducting or non-conducting lamp blacks, asbestos, and calcined clay and organic materials such as the phthalocyaniines, cork powder, sawdust, synthetic fibers and synthetic polymers (polytetrafluoroethylene, polyethylene, polypropylene, polystryene and polyvinyl chloride). The filler may be of a single type or mixtures of several types.

The above methods for producing the composition of the instant invention are preferably carried out in the presence of a solvent. The solvent is preferably the one used to prepare the resin component, for example, a hydrocarbon liquid such as benzene, toluene, xylene, heptane and others or a silicone liquid such as cyclic or linear polydiorganosiloxanes.

In the preparation of the compositions of the instant invention a process catalyst (F) may be optionally added to facilitate the reaction of the hydroxyl groups on the resin (A) with the hydrolyzable groups on the silane (C). Catalysts known in the art for facilitating a reaction between the hydroxyl and hydrolyzable groups are useful in the instant invention. Suitable process catalysts include, but are not limited to, amines, tin salts such as dibutyltin dilaurate, dibutyltin diacetate and stannous octanoate and titanates such as tetra n-butyl titanate or 2,3-di-isopropoxy-bis(ethylacetate)titanium. A sufficient quantity of catalyst (F) is added facilitate the reaction between the hydroxyl groups and the silane. Typically 0.01 to 2 weight percent is added based on the combined weight of (A) and (C). Preferably from 0.025 to 1.0 weight percent is added. The process catalyst is de-activated by an appropriate agent after the resin (A) and silane (C) have been reacted. It is, of course, understood that the above procedures are to be carried out in the absence of moisture in order to prevent premature curing of the compositions. This also applies to subsequent storage of the compositions.

So that those skilled in the art can understand and appreciate the invention taught herein, the following examples are presented, it being understood that these examples should not be used to limit the scope of this invention found in the claims attached hereto.

The following components were used in the examples.

RESIN 1 is a 72% solution in xylene of a solid MQ resin consisting essentially of trimethylsiloxane units and $SiO_{4/2}$ units in a molar ratio of about 0.8:1 and having a silicon-bonded hydroxyl content of about 2.6 weight percent based on FTIR and a number average molecular weight (Mn) of about 5,000.

RESIN 2 is a 62% solution in xylene of Resin 2 wherein the resin has been capped with trimethylsiloxy groups so as to provide a residual silicon-bonded hydroxyl content of about 1.0 wt % based on solids as determined by $Si^{29}$ NMR.

FLUID A is a polydimethylsiloxane fluid having a viscosity of approximately 450 $mm^2/s$ terminated with the units of the formula —$CH_2CH_2Si(Me)_2OSi(Me)_2CH_2CH_2Si(OMe)_3$.

FLUID B is a polydimethylsiloxane fluid having a viscosity of approximately 2,000 $mm^2/s$) terminated with the units of the formula —$CH_2CH_2Si(Me)_2OSi(Me)_2CH_2CH_2Si(OMe)_3$.

FLUID C is a triethoxysilyl-capped polydimethylsiloxane fluid having a viscosity of about 2,000 $mm^2/s$).

TBT is tetra n-butyl titanate

TDIDE is 2,5-di-isopropoxy-bis(ethylacetate)titanium.

SLURRY A is a mixture of 6 parts TBT, 17 parts Diisopropoxy Di(ethoxyacetoacetyl)titanate in a mixture of approximately 70 parts methyltrimethoxysilane, 3 parts aminoethylaminopropyltrimethyoxysilane, and 3 parts 3-mercaptopropyltrimethoxysilane.

The number average molecular weight of the above described resins was determined by gel-permeation chromatography (GPC) using Varian TSK 4000+2500 columns at 35° C., a chloroform mobile phase at 1 mL/min and an IR detector set at 9.1 micrometers to detect Si—O—Si. The GPC was calibrated using narrow fractions of similar resins as standards. The Mn values reported herein exclude any neopentamer, $(Me_3SiO)_4Si$, present in the resin component.

The trimethylsiloxy/$SiO_{4/2}$ ratio of the resins was determined by $^{29}Si$ NMR and, in this case, the reported results include any neopentamer component present in the resin.

The hydroxyl content of the resins was measured by an FTIR procedure based on ASTM E-168. This method comprises comparing the absorbance of a specific band in the infrared spectrum of the resin with the absorbance of the same band in a reference spectrum of known concentration.

Adhesion Testing

Adhesive strength of PSA compositions was determined as a function of cure time under ambient conditions using a plastic box construction. The box construction comprised four integrally-formed side walls and a detachable, form-fitting bottom plate. The box had a generally rectangular cross-section measuring 3.5 cm wide×6 cm long, had a wall height of 1.5 cm and had a wall thickness of 5 mm. Each side wall had a 3 mm wide recessed step along its bottom interior edge for receiving said bottom plate such that the exterior surface of the latter was flush with said edges when seated on said step.

In a typical adhesion evaluation, the plate was detached and a thin bead of molten PSA was extruded from a heated metal cartridge (approximately 150° C.) along the 3 mm wide step. The bottom plate was pressed into place so as to contact the adhesive on the step and thereby provide a box having an open top. The box additionally had external protrusions in two of its opposite walls which allowed it to be constrained in a special jig while the bottom plate was pushed out with the ram of an arbor press apparatus, the apparatus having been modified to measure the applied force. The force necessary to push the bottom plate out of the wall section was recorded and the test repeated on identical box constructions at various storage times at ambient conditions to asses adhesion and its improvement with cure.

COMPARATIVE EXAMPLE 1

Approximately 172 grams of Resin 1 was combined with 47.6 grams of isobutyltrimethoxy silane and 1 gram of TBT. The mixture was allowed to sit overnight in a loosely capped jar. After 24 hours, 76.0 grams of Fluid B was added to the mixture in a flask and put onto a rotovap. Bath temperature was increased from room temperature to 60° C. while the flask rotated. After 2 hours the bath temperature was increased to 90° C. and the mixture was stripped to <10 mmHg. 1.0 g of TBT and 1.0 g of isobutylcrimethoxy silane were added and blended at 95° C. without vacuum. The resulting composition was transferred to an aluminum cartridge for application. The material was then transferred to the inside rim of a plastic PBT box using a hot melt gun as described above.

After 2 weeks at rooms temperature the assembly was placed in a 150° C. oven for 30 minutes. The assembly was removed from the oven and immediately tested for the amount of force required to de-laminate the lid from the box assembly. 44.5 Newtons (N) was required to de-laminate the lid. Another box was placed in a 130° C. oven for 30 minutes. 53.4N was required to de-laminate the lid. The tests were repeated after 6 weeks cure at room temperature. an average of 35.6N was required to de-laminate the lid at 133° C. and 311.46N at room temperature.

COMPARATIVE EXAMPLE 2

Approximately 28 grams of Fluid C was combined with 10.75 grams of methyltrimethoxysilane and 0.35 grams TBT in a 3-nech reaction flask. Approximately 58.3 grams of Resin 1 was then added to the flask. The resultant mixture was heated to 60° C. and maintained at that temperature for approximately one hour, followed by devolatilization at reduced pressure (<10 mmHg) at a ramped temperature up to 150° C. Once devolatilized, the system was restored to 1 atmosphere and 0.35 grams of TDIDE was dispersed into the molten product. The material was then transferred to a metal cartridge for future application. The material was then transferred to the inside rim of a plastic PBT box using a hot melt gun as described above. Short term adhesive strength was monitored as a function of time.

| CURE TIME (room temp) | FORCE (N) |
| --- | --- |
| 20 min | 151.2 |
| 1 hr | 222.4 |
| 5 hr | 364.7 |
| 1 day | 471.5 |
| 7 days | 507.1 |

After approximately 2 weeks cure at room temperature the assembly was then placed in a 150° C. oven for 30 minutes. The assembly was removed from the oven and immediately tested for the amount of force required to de-laminate the lid from the box assembly. 44.5N was required to de-laminate the lid.

COMPARATIVE EXAMPLE 3

Approximately 67.4 grams of Resin 2 was combined with 28 grams of Fluid C followed by devolatilization at reduced pressure (<10 mmHg) at a ramped temperature up to 150° C. Once devolatilized, the system was restored to 1 atmosphere and 0.2 grams of TBT was dispersed into the molten product. The material was then transferred to a metal cartridge for future application. The material was then transferred to the inside rim of a plastic PBT box using a hot melt gun as described above. Short term adhesive strength was monitored as a function of time.

| CURE TIME (room temp) | FORCE (N) |
| --- | --- |
| 20 min | 111.2 |
| 1 hr | 129.0 |
| 5 hr | 284.7 |
| 1 day | 373.6 |
| 7 days | 431.5 |

After approximately 2 weeks cure at room temperature the assembly was then placed in a 150° C. oven for 30 minutes. The assembly was removed from the oven and immediately tested for the amount of force required to de-laminate the lid from the box assembly. 44.5N was required to de-laminate the lid.

COMPARATIVE EXAMPLE 4

Approximately 97.4 grams of Resin 2 was combined with 40 grams of Fluid A followed by devolatilization at reduced pressure (<10 mmHg) at a ramped temperature up to 150° C. Once devolatilized, the system was restored to 1 atmosphere and 1.0 grams of TBT was dispersed into the molten product. The material was then transferred to ametal cartridge for future application. The material was then transferred to the inside rim of a plastic PBT box using a hot melt gun as described above. Short term adhesive strength was monitored as a function of time. After one month cure at room temperature the force to de-laminate the lid was 120 at room temperature, 155.0N at 130° C. and 75.6N at 150° C.

COMPARATIVE EXAMPLE 5

93.6 grams of Resin 2 was combined with 40 grams of Fluid A followed by the addition of 0.05 grams of Sn(Oct)$_2$. The mixture was heated to 60° C. and held for 30 minutes. The mixture gelled during the heating step.

EXAMPLE 1

Approximately 93.6 grams of Resin 2 was combined with 4.1 grams of isobutyltrimethoxy silane and 0.05 grams of Sn(Oct)$_2$ in a flask and place on the rotovap. Bath temperature was raised to 70° C. and the flask was rotated in the bath for 1 hours. 0.5 grams of mercaptopropyltrimethoxysilane was added to the mixture to neutralize the catalyst. After 30 minutes, 2.5 grams was removed for analysis and then 39 grams of Fluid A was added to the remainder. The bath temperature was raised to 90° C. while rotating and the mixture was devolatilized to 10 mmHg. 1 gram of TBT was added and allowed to mix for 5 minutes. The resulting composition was transferred to an aluminum cartridge for application. The material was then transferred to the inside rim of a plastic PBT box using a hot melt gun as described above. Short term adhesive strength was monitored as a function of time. After approximately 2 weeks cure at room temperature one assembly was then placed in a 150° C. oven for 30 minutes and another was placed in a 130° C. oven for 30 minutes. Another assembly was tested after 30 minutes in a 130° C. oven after 6 weeks cure at room temperature. The assemblies were removed from the oven and immediately tested for the amount of force required to de-laminate the lid from the box assembly.

| CURE TIME | FORCE (N) |
| --- | --- |
| 1 min. @ RT | 35.6 |
| 24 hr. @ RT | 444.8 |
| 2 wk. @ RT | 756.2 |
| @ 130° C. (2 wk) | 169.0 |
| @ 150° C. | 133.4 |
| 6 wk. @ RT | 747.3 |
| 130° C. (6 wk) | 142.3 |

EXAMPLE 2

Approximately 187.2 grams of Resin 2 was combined with 8.2 grams of isobutyltrimethoxy silane in a flask and place on the rotovap. Bath temperature was raised to 70° C. and the flask was rotated in the bath for 1 hours. 78 grams of Fluid A was added to the remainder. The bath temperature was raised to 90° C. while rotating and the mixture was devolatilized to 10 mmHg. 2 grams of TBT was added and allowed to mix for 5 minutes. The resulting composition was transferred to an aluminum cartridge for application. The material was then transferred to the inside rim of a plastic PBT box using a hot melt gun as described above. The force required to de-laminate the lid after 6 weeks was 769.5N at room temperature and 142.3N at 130° C.

EXAMPLE 3

151 grams of a mixture, prepared by blending 325 grams of Resin 2 with 9.6 grams of isobutyltrimethoxy silane, was combined with 60.0 grams of Fluid A followed by the addition of 0.08 grams of Sn(Oct)$_2$. The mixture was heated to 50° C. and held there for 30 minutes. 0.75 grams of mercaptopropyltrimethoxysilane was added to the mixture to neutralize the catalyst. After 20 minutes the mixture was de-volatilized and 1.50 grams of TBT was added to the de-volatilized product at room temperature. The resulting composition was transferred to an aluminum cartridge for application. The material was then transferred to the inside rim of a plastic PBT box using a hot melt gun as described above. The force required to de-laminate the lid after 6 weeks was 738.4N at room temperature and 164.6N at 130° C.

EXAMPLE 4

133.7 grams of a mixture, prepared by blending 125.9 grams of Resin 2 with 9.1 grams of methyltri(ethylmethylketoxime)silane, was combined with 51.6 grams of Fluid A followed by the addition of 0.07 grams of Sn(Oct)$_2$. The mixture was heated to 50° C. and held there for 30 minutes. 0.65 grams of mercaptopropyltrimethoxysilane was added to the mixture to neutralize the catalyst. After 30 minutes the mixture was de-volatilized and 1.29 grams of TBT was added to the de-volatilized material. The resulting composition was transferred to an aluminum cartridge for application. The material was then transferred to the inside rim of a plastic PBT box using a hot melt gun as described above. The force required to de-laminate the lid after 6 weeks was 890+N at room temperature and 244.6N at 130° C.

EXAMPLE 5

Approximately 93.6 grams of Resin 2 was combined with 4.1 grams of isobutyltrimethoxy silane and 0.025 grams of Sn(Oct)$_2$ in a flask and place on the rotovap. Bath temperature was raised to 70° C. and the flask was rotated in the bath for 1 hours. 0.25 grams of mercaptopropyltrimethoxysilane was added to the mixture to neutralize the catalyst. After 30 minutes, 39 grams of Fluid A was added to the remainder. The bath temperature was raised to 90° C. while rotating and the mixture was devolatilized to 10 mmHg. 1 gram of TBT was added and allowed to mix for 5 minutes. The resulting compsotion was transferred to an aluminum cartridge for application. The material was then transferred to the inside rim of a plastic PBT box using a hot melt gun as described above The force required to de-laminate the lid after 6 weeks was 609.4N at room temperature and 75.6N at 130° C.

EXAMPLE 6

97.4 grams of Resin 2 and methyltri(ethylmethylketoxime) silane (amounts given in Table 1) were combined. The mixture was heated to 60° C. and held there for 30 minutes. 40 grams of Fluid B was added to the mixture. The mixture was de-volatilized and 1.0 grams of TBT was added tot he de-volatilized material. The resulting composition was transferred to an aluminum cartridge for application. The material was then transferred to the inside rim of a plastic PBT box using a hot melt gun as described above. The tests at the elevated temperatures was conducted after at least one month's cure at room temperature.

TABLE 1

|  | A | B | C | D |
|---|---|---|---|---|
| Amt. Ketoxime Silane (g) | 6 | 4.9 | 2.4 | 0.0 |
| Force to de-laminate (N) | | | | |
| 20 min @ RT | 40.0 | 53.4 | 80.1 | 84.5 |
| 24 hr @ RT | 573.8 | 556.0 | 462.6 | 302.5 |
| 1 week @ RT | 880.7 | 814.0 | 769.5 | 498.2 |
| 1 month @ RT | 702.8 | 680.5 | 631.6 | 400.3 |
| 130° C. | 355.8 | 338.0 | 204.6 | 106.8 |
| 150° C. | 289.1 | 271.3 | 115.6 | 102.3 |

EXAMPLE 7

97.4 grams of Resin 2, isobutyltrimethoxysilane (amount given in Table 2) and 0.05 grams of $Sn(Oct)_2$ were combined. The mixture was heated to 75° C. and held there for 30 minutes. 0.5 grams of mercaptopropyltrimethoxysilane was added to the mixture to neutralize the catalyst. The mixture was held at 75° C. for 30 minutes. 40 grams of Fluid B was added to the mixture. The mixture was de-volatilized and 1.0 grams of TBT was added to the de-volatilized material. The resulting composition was transferred to an aluminum cartridge for application. The material was then transferred to the inside rim of a plastic PBT box using a hot melt gun as described above. The tests at the elevated temperature was conducted after at least one month cure at room temperature.

TABLE 2

|  | A | B | C | D |
|---|---|---|---|---|
| Amt. Methoxy Silane (g) | 4.3 | 2.9 | 1.4 | 0.0 |
| Force to de-laminate (N) | | | | |
| 20 min @ RT | 102.3 | 133.4 | 115.6 | 84.5 |
| 24 hr @ RT | — | — | — | 302.5 |
| 1 week @ RT | 382.5 | 462.6 | 409.2 | 498.2 |
| 1 month @ RT | 471.5 | 471.5 | 600.5 | 400.3 |
| 130° C. | 177.9 | 195.7 | 97.9 | 106.8 |
| 150° C. | 177.9 | 137.9 | 129.0 | 102.3 |

EXAMPLE 8–9

97.4 grams of Resin 2, 4.1 grams of isobutyltrimethoxy silane and 40.0 grams of Fluid A were combined followed by the addition of 0.05 grams of DBTDL. The mixture was heated to 50° C. (Example 8), 100° C. (Example 9) and held there for 30 minutes. 0.5 grams of mercaptopropyltrimethoxysilane was added to the mixture to neutralize the catalyst. After 30 minutes, each mixture was de-volatilized and 1.0 gram of TBT was added to each de-volatilized product. The resulting compositions were transferred to aluminum cartridges for application. The material was then transferred to the inside rim of a plastic PBT box using a hot melt gun as described above. The force required to de-laminate the lid after one month was 711.7N (Example 8), 747.3N (Example 9) at room temperature; 195.7N lbs. (Example 8), 320.3N (Example 9) at 130° C.; and 124.5N (Example 8), 373.6N (Example 9) at 150° C.

EXAMPLE 10

Approximately 6.97 grams of methyltri(ethylmethylketoxime) silane was combined with 96.6 grams of Resin 2 and reacted for an hour at 60° C. Approximately 40 grams of Fluid A was then added and thoroughly mixed with resin/silane mixture. The system was de-volatilized and 1.0 grams of TBT and 0.5 grams of a reaction product of 73.5 wt % glycidoxypropyltrimethoxysilane and 26.5 wt % aminopropyltrimethoxysilane were added to the molten mixture. The resulting composition was transferred to an aluminum cartridge for application. The material was then transferred to the inside rim of a plastic PBT box using a hot melt gun as described above. The force required to de-laminate the lid after one month was 756.2N at room temperature; 240.2N at 130° C.; and 177.9N at 150° C.

EXAMPLE 11

The following silanes were used in this example:
Silane A: glycidoxypropyltrimethoxysilane
Silane B: aminoethylaminopropyltrimethoxysilane
Silane C: 3-methacryloxypropyltrimethoxysilane
Silane D: phenyltrimethoxysilane In these examples, 97.4 grams of Resin 2 was combined with the silane (See Table 3) and 40.0 gram of Fluid A. 0.05 grams of DBTDL was added and the mixture was heated to 100° C. and held there for 30 minutes. 0.5 grams of mercaptopropyltrimethoxysilane was added to the mixture to neutralize the catalyst. After 30 minutes the mixture was de-volatilized and 1.0 grams of TBT was aded to the molten material. The resulting composition was transferred to an aluminum cartridge for application. The material was then transferred to the inside rim of a plastic TBT box using a hot melt gun as described above. Results are given in Table 3.

TABLE 3

| Silane | A | B | C | D |
|---|---|---|---|---|
| Amt. Silane (g) | 7.5 | 7.1 | 5.7 | 6.3 |
| Force to de-laminate (N) | | | | |
| 20 min @ RT | 17.8 | 53.4 | 26.7 | 26.7 |
| 1 hr @ RT | 22.2 | 102.3 | 44.5 | 62.3 |
| 1 day @ RT | 222.4 | 160.1 | 275.8 | 209.1 |
| 1 week @ RT | 800.6 | 667.2 | 862.9 | 774.0* |
| 1 month @ RT | >890 | 756.2 | 849.6 | 802.9 |
| 130° C. | 489.3 | 133.4 | 253.5 | 282.4 |
| 150° C. | 542.7 | 124.5 | 240.2 | 255.8 |

*Sample tested at 9 days @ RT

EXAMPLE 12

Approximately 250 grams of Resin 2 was combined with 19 grams of isobutyltrimethoxysilane and reacted for 4 hours at 100° C. in the presence of stannous octoate. Approximately 0.2 grams of mercaptopropyltrimethoxysilane was then added to neutralize the catalyst and the system was reacted for another 30 minutes. The resulting resin was cooled to room temperature.

To 104.8 grams of this resin was added 72 grams of mixture of approximately 53 wt % of a dimethyl siloxane fluid terminated with $(CH_3O)_3SiCH_2CH_2Si(CH_3)_2O$—groups and having a viscosity of approximately 65,000 $mm^2/s$; 37 wt % $CaCO_3$ (ppt, stearate); 5 wt % calcium carbonate treated with stearic acid; 1 wt % lampblack; and 4 wt % of Slurry A. The resulting mixture allowed to blend for 2 hours at 100° C. The mixture was de-volatilized by heating at 130° C. at less than 10 mm Hg pressure and then maintained for an additional 15 minutes at that condition. The system was then restored to atmospheric pressure and the product was recovered.

EXAMPLE 13

Approximately 97.4 grams of Resin 2 was combined with 8.79 grams of methyl tri(methylethylketoximo)silane) and blended at room temperature for 30 minutes.

To this resin was added 72.0 grams of mixture of approximately 53 wt % of a dimethyl siloxane fluid terminated with $(CH_3O)_3SiCH_2CH_2Si(CH_3)_2O$— groups and having a viscosity of approximately 65,000 mm$^2$/s; 37 wt % CaCO$_3$ (ppt, stearate); 5 wt % calcium carbonate treated with stearic acid; 1 wt % lampblack; and 4 wt % of Slurry A. The resulting mixture was allowed to blend for 2 hours at 100° C. The mixture was de-volatilized by heating at 130° C. at less than 10 mm Hg pressure and then maintained for an additional 15 minutes at that condition. The system was then restored to atmospheric pressure and the product was recovered.

EXAMPLE 14

To 97.4 grams of Resin 2 was added 72.0 grams of mixture of approximately 53 wt % of a dimethyl siloxane fluid terminated with $(CH_3O)_3SiCH_2CH_2Si(CH_3)_2O$— groups and having a viscosity of approximately 65,000 mm$^2$/s; 37 wt % CaCO$_3$ (ppt, stearate); 5 wt % calcium carbonate treated with stearic acid; 1 wt % lampblack; and 4 wt % of Slurry A. The resulting mixture was allowed to blend overnight. The mixture was de-volatilized by heating at 130° C. at less than 10 mm Hg pressure and then maintained for an additional 15 minutes at that condition. The system was then restored to atmospheric pressure and the product was recovered.

EXAMPLE 15

To 89.3 grams of Resin 2 was added 81.0 grams of mixture of approximately 53 wt % of a dimethyl siloxane fluid terminated with $(CH_3O)_3SiCH_2CH_2Si(CH_3)_2O$— groups and having a viscosity of approximately 65,000 mm$^2$/s; 37 wt % CaCO$_3$ (ppt, stearate); 5 wt % calcium carbonate treated with stearic acid; 1 wt % lampblack; and 4 wt % of Slurry A. The resulting mixture was allowed to blend overnight. The mixture was de-volatilized by heating at 130° C. at less than 10 mm Hg pressure and then maintained for an additional 15 minutes at that condition. The system was then restored to atmospheric pressure and the product was recovered.

EXAMPLE 16

The adhesives prepared in Examples 12–15 were cast as films on 2 mil Mylar sheets which had been treated with a fluorosilicone release coating and cured at room temperature for approximately 2 weeks. Tensile bars having a width and gauge length of 0.25 and 0.90 inches, respectively, were stamped from the resultant coated sheets; isolated as free films; and evaluated for tensile and elongation characteristics. Samples were tested using an Instron, Table Model 1122, a crosshead speed of 2 inches/min., and a load cell sufficient to accurately measure loads ranging from one to ten pounds.

For comparison a film was prepared from a mixture of approximately 53 wt % of a dimethyl siloxane fluid terminated with $(CH_3O)_3SiCH_2CH_2Si(CH_3)_2O$— groups and having a viscosity of approximately 65,000 mm$^2$/s; 37 wt % CaCO$_3$ (ppt, stearate); 5 wt % calcium carbonate treated with stearic acid; 1 wt % lampblack; and 4 wt % of Slurry A. Results are summarized in Table 4.

TABLE 4

| | Tensile @ Break (psi) | Elongation @ Break (%) |
|---|---|---|
| Comparison | 314 | 400 |
| Example 12 | 144.5 | 1200 |
| Example 13 | 276 | 720 |
| Example 14 | 241 | 952 |
| Example 15 | 361 | 999 |

What is claimed is:

1. A pressure sensitive adhesive composition comprising
   (A) 40 to 70 parts of a hydrocarbon or silicone liquid soluble, capped, organopolysiloxane resin consisting essentially of $R_3SiO_{1/2}$ siloxane units and $SiO_{4/2}$ siloxane units, wherein R is a monovalent hydrocarbon radical having 1 to 18 carbon atoms; there being from 0.5 to 1.5 $R_3SiO_{1/2}$ units for every $SiO_{4/2}$ unit; said resin containing less than 1.0 weight percent silicon-bonded hydroxyl groups based on the total weight of (A) solids as determined by Si$^{29}$ NMR;
   (B) 30 to 60 parts of a diorganopolysiloxane polymer, each terminal group thereof selected from the group consisting of R and alkoxy radicals having 1 to 4 carbon atoms with the proviso that each terminal group contain at least one silicon-bonded alkoxy radical having 1 to 4 carbon atoms; each repeat unit of said polymer consisting essentially of $R_2SiO_{2/2}$ siloxy units; wherein R is independently selected from the same hydrocarbon and halogenated hydrocarbon radicals delineated for resin (A); said polymer having a viscosity at 25° C. of 20 to 100,000 mm$^2$/s; wherein the amount of (A) and (B) comprises 100 parts; and
   (C) 1 to 30 parts per 100 parts of resin (A) solids of a silane represented by monomers of the formula $R^3_{4-y}SiX_y$, or oligomeric reaction products thereof, in which $R^3$ is selected from the group consisting of hydrocarbon radicals and substituted hydrocarbon radical having 1–6 carbon atoms, X is a hydrolyzable group and y is 2 to 4.

2. A pressure sensitive adhesive as claimed in claim 1 wherein in resin (A) the ratio of $R_3SiO_{fra\ 1/2}$ siloxane units to $SiO_{4/2}$ siloxane units is from 0.6:1 to 1.0:1.

3. A pressure sensitive adhesive as claimed in claim 1 wherein in resin (A) R is methyl.

4. A pressure sensitive adhesive as claimed in claim 1 wherein the viscosity of diorganopolysiloxane polymer (B) is from 350 to 60,000 mm$^2$/s at 25° C.

5. A pressure sensitive adhesive as claimed in claim 1 wherein the terminal groups of diorganopolysiloxane polymer (B) contain at least two alkoxy radicals selected from alkoxy radicals of the formula $-ZSiR^1_x(OR^2)_{3-x}$ wherein $R^1$ is a monovalent hydrocarbon radical, $R^2$ is selected from the group consisting of a alkyl radical and alkoxyalkyl radical, Z is a divalent linking radical, and the subscript x ahs a value of 0 or 1.

6. A pressure sensitive adhesive as claimed in claim 5 wherein the alkoxy radicals are selected from the group consisting of $(MeO)_3SiCH_2CH_2$—, $(MeO)_3SiO$—, $Me(MeO)_2SiO$—, $(MeO)_3SiCH_2CH_2Si(Me_2)CH_2CH_2Si(Me_2)O$—, $(MeO)_3SiCH_2CH_2Si(Me_2)O$—, $(MeO)_3SiCH_2CH_2Si(Me_2)OSi(Me_2)OSi(Me_2)O$—, and $(MeO)_3SiCH_2CH_2Si(Me_2)OSi(Me_2)CH_2CH_2$—.

7. A pressure sensitive adhesive as claimed in claim 5 wherein the alkoxy radicals are $(MeO)_3SiCH_2CH_2Si(Me_2)OSi(Me_2)CH_2CH_2$—.

8. A pressure sensitive adhesive as claimed in claim 1 wherein there is from 35 to 45 parts of diorganopolysiloxane polymer (B).

9. The composition as claimed in claim 1 wherein X is selected from the group consisting of alkoxy radicals having 1 to 4 carbon atoms, ketoxime radicals, aminoxy radicals, acetamido radicals, N-methylacetamido radicals and acetoxy radicals.

10. The composition as claimed in claim 9, wherein X is an alkoxy radical having 1 to 4 carbon atoms.

11. The composition as claimed in claim 10, wherein silane (C) is selected from the group consisting of methyltrimethoxysilane, methyltriethoxysilane, propyltrimethoxysilane, tetramethoxysilane, tetraethoxysilane, phenyltrimethoxysilane, isobutyltrimethoxysilane, ethyltrimethoxysilane, glycidoxypropyltrimethoxysilane, aminoethylaminopropyltrimethoxysilane, aminopropyltriethoxysilane, and 3-methacryloxypropyltrimethoxysilane.

12. The composition as claimed in claim 11 wherein silane (C) is isobutyltrimethoxysilane.

13. The composition as claimed in claim 11 wherein silane (C) is glycidoxypropyltrimethoxysilane.

14. The composition as claimed in claim 11 wherein silane (C) is aminoethylaminopropyltrimethoxysilane.

15. The composition as claimed in claim 11 wherein silane (C) is 3-methacryloxypropyltrimethoxysilane.

16. The composition as claimed in claim 11 wherein silane (C) is phenyltrimethoxysilane.

17. The composition as claimed in claim 11 wherein silane (C) is aminopropyltriethoxysilane.

18. The composition as claimed in claim 9, wherein X is a ketoxime radical having the formula $-ONC(R^5)_2$ wherein each $R^5$ is independently an alkyl group having 1 to 6 carbon atoms or a phenyl group.

19. The composition as claimed in claim 18, wherein silane (C) is selected from the group consisting of tetra(methylethylketoximo)silane, methyl-tris(methylethylketoximo)silane and vinyl-tris(methylethylketoximo)silane.

20. The composition as claimed in claim 19 wherein silane (C) is methyl-tris(methylethylketoximo)silane.

21. The composition as claimed in claim 9 wherein X is an acetoxy radical.

22. The composition as claimed in claim 21 wherein silane (C) is selected from the group consisting of methyltriacetoxysilane, and ethyltriacetoxysilane.

23. The composition as claimed in claim 1 wherein there are 2 to 10 parts of silane (C).

24. The composition as claimed in claim 1 wherein there is additionally (D) sufficient cure catalyst to accelerate the cure of said composition.

25. The composition as claimed in claim 24 wherein the catalyst is tetra n-butyl titanate.

26. The composition as claimed in claim 1 wherein there is additionally (E) up to 80 weight percent filler.

27. A pressure sensitive adhesive composition comprising
(A) 40 to 70 parts of a hydrocarbon or silicone liquid soluble, capped, organopolysiloxane resin consisting essentially of $R_3SiO_{1/2}$ siloxane units and $SiO_{4/2}$ siloxane unit, wherein R is a monovalent hydrocarbon radical having 1 to 18 carbon atoms; there being from 0.5 to 1.5 $R_3SiO_{1/2}$ units for every $SiO_{4/2}$ units; said resin containing less than 1.0 weight percent silicon-bonded hydroxyl groups based on the total weight of (A) solids as determined by $Si^{29}$ NMR;
(B) 30 to 60 parts of a diorganopolysiloxane polymer, each terminal group thereof selected from the group consisting of R and ketoxime radicals with the proviso that each terminal group contain at least one silicon-bonded ketoxime radical; each repeat unit of said polymer consisting essentially of $R_2SiO_{2/2}$ siloxy units wherein R is independently selected from the same hydrocarbon and halogenated hydrocarbon radicals delineated for resin (A); said polymer having a viscosity at 25° C.

28. A pressure sensitive adhesive as claimed in claim 27 wherein in resin (A) the ratio of $R_3SiO_{1/2}$ siloxane units to $SiO_{4/2}$ siloxane units is from 0.6:1 to 1.0:1.

29. A pressure sensitive adhesive as claimed in claim 27 wherein in resin (A) R is methyl.

30. A pressure sensitive adhesive as claimed in claim 27 wherein the viscosity of diorganopolysiloxane polymer (B) is from 350 to 60,000 mm²/s at 25° C.

31. A pressure sensitive adhesive as claimed in claim 27 wherein there is from 35 to 45 parts of diorganopolysiloxane polymer (B).

32. The composition as claimed in claim 27 wherein X is selected from the group consisting of alkoxy radicals having 1 to 4 carbon atoms, ketoxime radicals, aminoxy radicals, acetamido radicals, N-methylacetamido radicals and acetoxy radicals.

33. The composition as claimed in claim 27 wherein there are 2 to 10 parts of silane (C).

34. The composition as claimed in claim 27 wherein there is additionally (D) sufficient cure catalyst to accelerate the cure of said composition.

35. The composition as claimed in claim 34 wherein the catalyst is tetra n-butyl titanate.

36. The composition as claimed in claim 27 wherein there is additionally (E) up to 50 weight percent filler.

\* \* \* \* \*